United States Patent
Schmidt

(10) Patent No.: US 7,624,511 B1
(45) Date of Patent: Dec. 1, 2009

(54) PIPE BENDING TEMPLATE

(76) Inventor: Matthew G. Schmidt, 3510 Richland Hills Dr., Wisconsin Rapids, WI (US) 54494

( * ) Notice: Subject to any disclaimer, the term of this patent is extended or adjusted under 35 U.S.C. 154(b) by 0 days.

(21) Appl. No.: 12/407,808

(22) Filed: Mar. 20, 2009

(51) Int. Cl.
*G01B 1/00* (2006.01)

(52) U.S. Cl. .......................................... 33/529; 33/562

(58) Field of Classification Search ............... 33/529, 33/533, 534, 538, 562–566, 561.1, 561.2, 33/561.3, 412, 343, 370–373
See application file for complete search history.

(56) References Cited

U.S. PATENT DOCUMENTS

| | | | | |
|---|---|---|---|---|
| 3,200,505 A * | 8/1965 | Hedges | ..................... | 33/529 |
| 3,209,459 A * | 10/1965 | Fish, Jr. | ..................... | 33/562 |
| 4,009,602 A * | 3/1977 | Linquist | ..................... | 33/529 |
| 4,807,370 A * | 2/1989 | Trimble | ..................... | 33/529 |
| 5,167,075 A * | 12/1992 | Weldy et al. | ..................... | 33/343 |
| 5,768,790 A * | 6/1998 | Norman | ..................... | 33/529 |
| 6,077,000 A * | 6/2000 | Gibbons et al. | ..................... | 33/529 |
| 6,385,856 B1 * | 5/2002 | Godin | ..................... | 33/343 |
| 6,470,586 B2 * | 10/2002 | Kneipp | ..................... | 33/529 |
| 6,854,190 B1 * | 2/2005 | Lohmann | ..................... | 33/1 SB |
| 6,996,911 B1 * | 2/2006 | Dinius | ..................... | 33/481 |
| 7,134,218 B1 * | 11/2006 | Mitchell | ..................... | 33/529 |
| 7,251,902 B1 * | 8/2007 | Mueller | ..................... | 33/562 |
| 7,350,311 B2 * | 4/2008 | Marks | ..................... | 33/563 |
| 7,421,461 B2 * | 9/2008 | Prokop | ..................... | 33/529 |
| 2002/0139000 A1 * | 10/2002 | Kneipp | ..................... | 33/529 |
| 2007/0175059 A1 * | 8/2007 | Mueller | ..................... | 33/562 |
| 2008/0201974 A1 * | 8/2008 | Kato | ..................... | 33/551 |
| 2009/0205216 A1 * | 8/2009 | Ai | ..................... | 33/563 |

* cited by examiner

*Primary Examiner*—Yaritza Guadalupe-McCall
(74) *Attorney, Agent, or Firm*—Donald J. Ersler

(57) ABSTRACT

A pipe bending template includes an object with four indicator marks displayed along a length thereof. The four indicator marks are spaced according to a bend radius and a bend angle of a pipe. The object may be formed from a plate, a tube, a flat screen display or a slide rule. With a plate, the indicator marks are displayed along an edge of the plate. With a tube, the indicator marks are notches cut through the tube. The tube is sized to receive an outside perimeter of the pipe. With a flat screen display, the indicator marks are displayed along an edge of the flat screen display. With a slide rule the indicator marks are arranged in different rows along a length of the slide rule. The slide rule also includes four indicator strips that are aligned with the indicator marks on the slide rule.

20 Claims, 5 Drawing Sheets

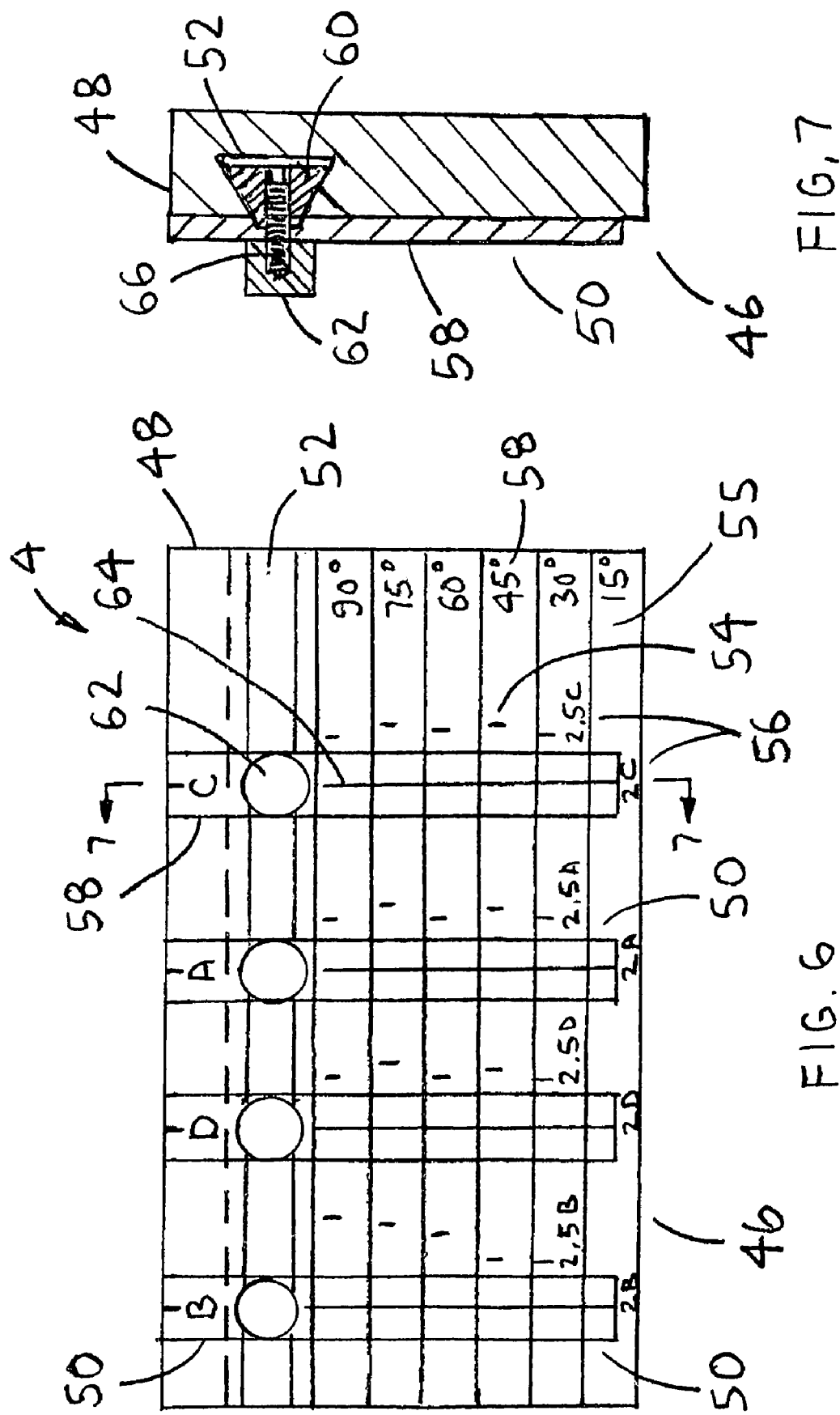

PIPE BENDING TEMPLATE

BACKGROUND OF THE INVENTION

1. Field of the Invention

The present invention relates generally to being pipes and more specifically to a pipe bending template, which allows pipes to be efficiently marked and accurately bent to different radii and at different angles.

2. Discussion of the Prior Art

Most pipe benders will have markings for bending a pipe to a particular radius and angle. However, these marking frequently provide inaccurate bends, which requires the user to discard or rework the bent pipe. Most of the markings are for 45 or 90 degrees. Other angles besides 45 to 90 degrees require the user to guess where the pipe should be positioned.

Accordingly, there is a clearly felt need in the art for a pipe bending template, which allows a pipe to be efficiently pre-marked for accurately bending to produce different radii at different angles along a length of the pipe.

SUMMARY OF THE INVENTION

The present invention provides a pipe bending template, which allows pipes to be accurately bent to different radii and at different angles. The pipe bending template includes an object with four indicator marks displayed along a length thereof. The four indicator marks are spaced according to a radius of a pipe bend and an angle of the pipe bend. For example, a pipe with two bends includes three straight sections and two radius sections. A distance between an end of the pipe and a centerline of the second straight section is matched with a first indicator mark on the pipe bending template.

A second indicator mark on the pipe bending template is matched with a 0 degree bend mark on a pipe bender. The distance between the first and second indicator marks is a function of the radius of the first radius section and an angle of the radius. A distance between the second mark and a third indicator mark on the pipe bending template is a distance along a length of a centerline of the first radius. A distance from the third indicator back to a fourth indicator mark on pipe bending template is the same as the distance between the first and second indicator marks. Marks are made along the pipe adjacent to the indicator marks on the pipe bending template. The second straight section is created by measuring from the fourth indicator mark and marking off the length on the pipe. The process is repeated to form the second radius. A third straight section is created by measuring a second fourth indicator mark to a second end of the pipe.

The object may be formed from a flat plate, a tube, a flat screen display or a slide rule. With a flat plate, the indicator marks are displayed along an edge of the flat plate. With a tube, the indicator marks are notches cut through the tube. An inner perimeter of the tube is sized to receive an outside perimeter of the pipe. With a flat screen display, the indicator marks are displayed along an edge of the flat screen display. With a slide rule the indicator marks are arranged in different rows along a length of the slide rule. The slide rule also includes four indicator strips that are aligned with the indicator marks on the slide rule. The four indicator strips are secured along a length of the slide rule.

Accordingly, it is an object of the present invention to provide a pipe bending template, which allows a pipe to be efficiently pre-marked for accurate bending to produce different radii at different angles along a length of the pipe.

These and additional objects, advantages, features and benefits of the present invention will become apparent from the following specification.

BRIEF DESCRIPTION OF THE DRAWINGS

FIG. 6 is a top view of a fourth embodiment of a bending template created with a slide rule in accordance with the present invention.

FIG. 7 is an end view of a fourth embodiment of a bending template created with a slide rule in accordance with the present invention.

DETAILED DESCRIPTION OF THE PREFERRED EMBODIMENTS

With reference now to the drawings, and particularly to FIGS. 1-7, there is shown a pipe 100 with a plurality of transfer marks 102 for creating three straight sections and two radiused sections using a pipe bending template 1-4. The pipe bending template 1-4 includes an object with four indicator marks displayed along a length thereof. The four indicator marks are spaced according to a radius R of a pipe bend and an angle G of the pipe bend. The pipe 100 includes three straight sections and two radius sections. A distance L1 between a first end of the pipe 100 and a centerline of the second straight section is matched with a first indicator mark A on the pipe bending template 1-4.

A second indicator mark B on the pipe bending template 1-4 is matched with a 0 degree bend mark on a pipe bender (not shown). Pipe benders are well known in the art and need not be explained in detail. A distance BA between the first and second indicator marks is a function of the radius R1 of the first radius section and an angle G1 of the first radius section. Specifically, the relationship is defined by the equation:

$$BA = \text{TAN}(G\tfrac{1}{2}) \times R1$$

For example, the value of BA for an angle of 90 degrees and a radius of 2 inches is 2 inches. Where TAN (tangent) is a trigonometric function. A distance BC between the second mark B and a third indicator mark C on the pipe bending template is a distance along a length of a centerline of the first radius R1. The distance BC is defined by the following equation:

$$BC = 0.01745 \times R1 \times G1$$

Figure 1:
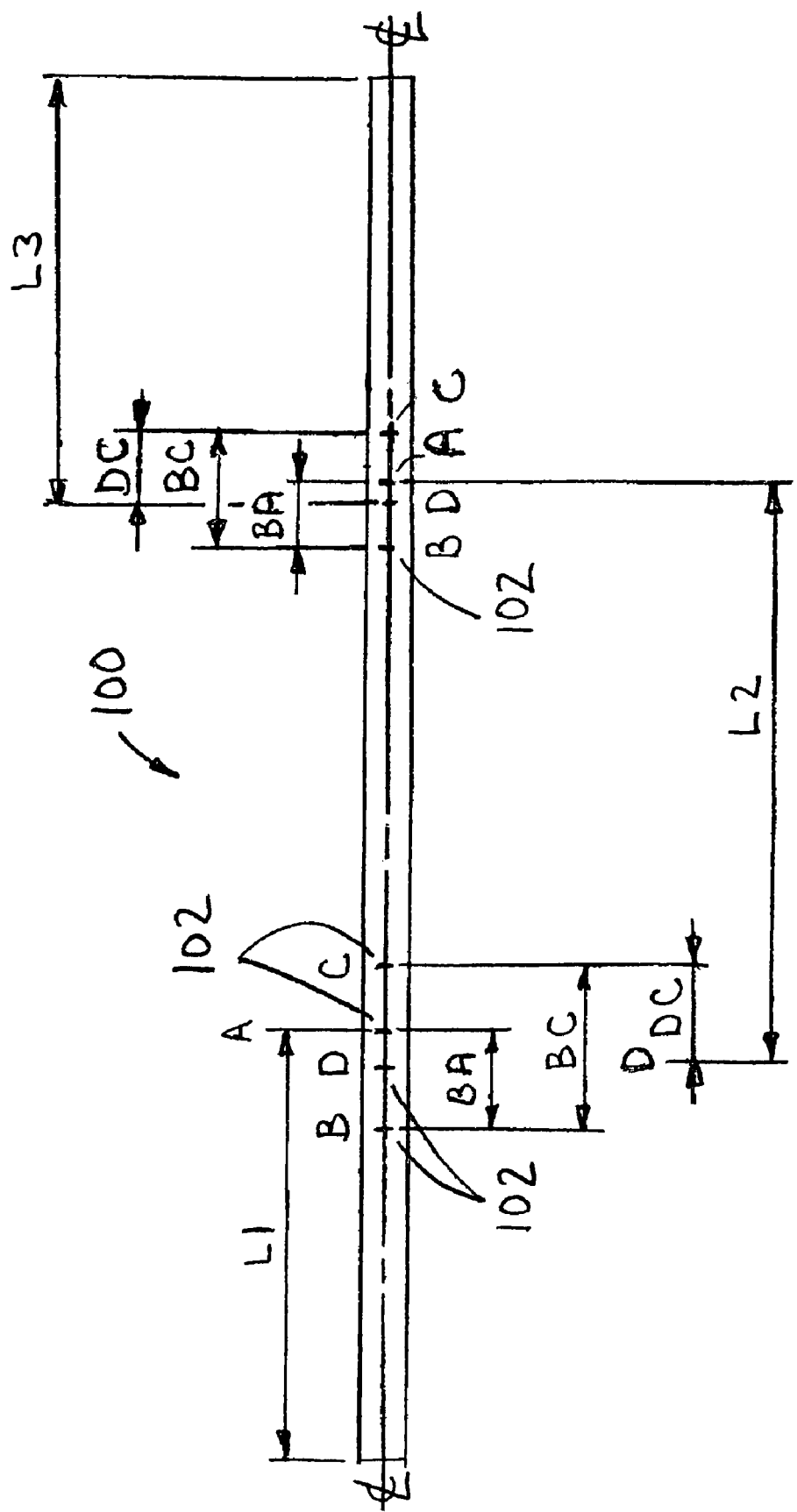
FIG. 1 is a front view of a straight pipe marked-up to have three straight sections and two radiused sections using a pipe bending template in accordance with the present invention.
Figure 2:
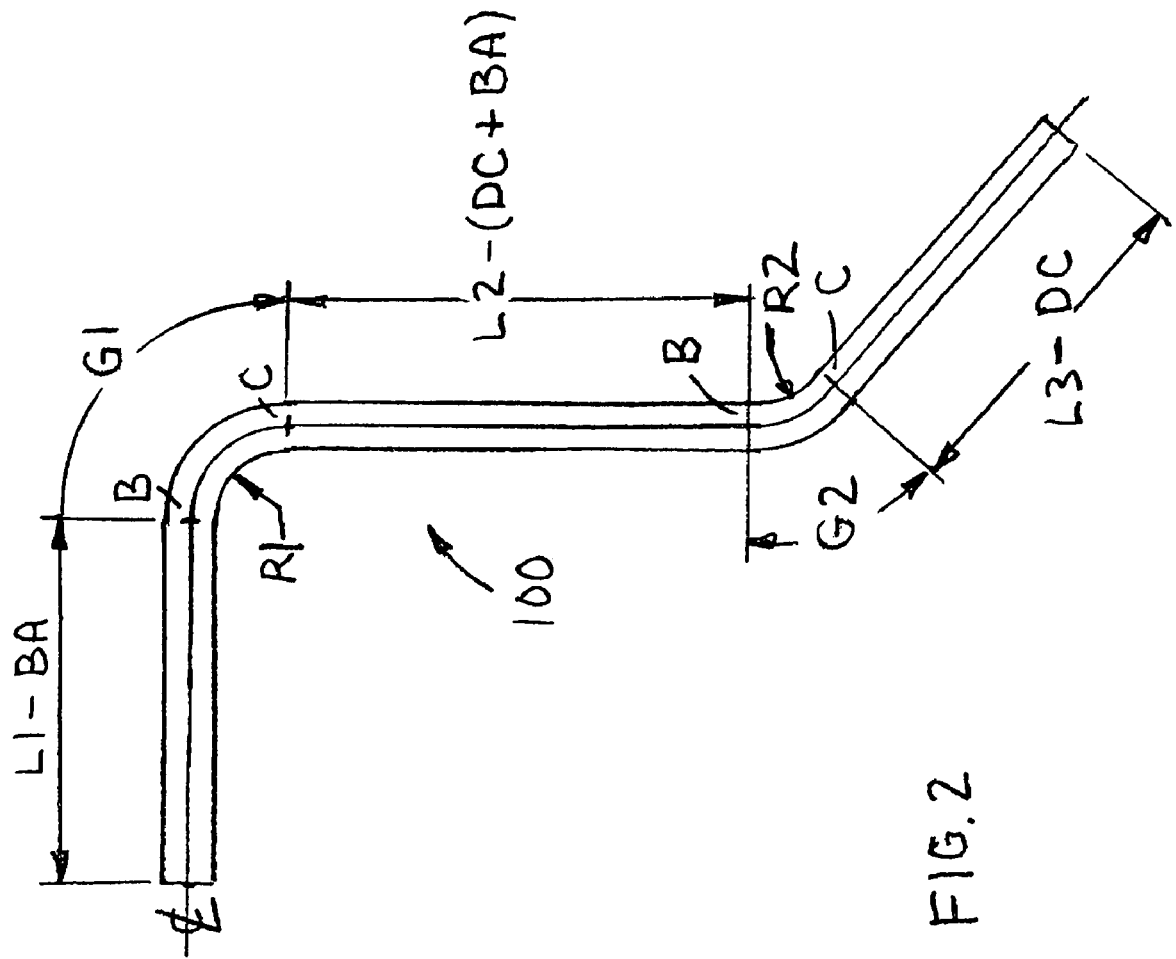
FIG. 2 is a front view of a pipe having three straight sections and two radiused sections after bending in accordance with the present invention.

For example, the value of BC for an angle of 90 degrees and a radius of 2 inches is 3.14 inches. A distance DC from the third indicator C back to a fourth indicator mark D on pipe bending template 1-4 is equal to the distance BA between the first and second indicator marks. Indicator marks 102 are made along the pipe 100 adjacent to the indicator marks on the pipe bending template 1-4. The second straight section L2 is created by measuring from the fourth indicator mark D and marking off the length on the pipe 100 with second indicator marks A-D. The process is repeated to form a second radius section with radius R2 and angle G2. A third straight section L3 is created by measuring a second fourth indicator mark D to a second end of the pipe 100. With reference to FIG. 2, the pipe 100 is bent using the plurality of transfer marks 102.

Figure 3:
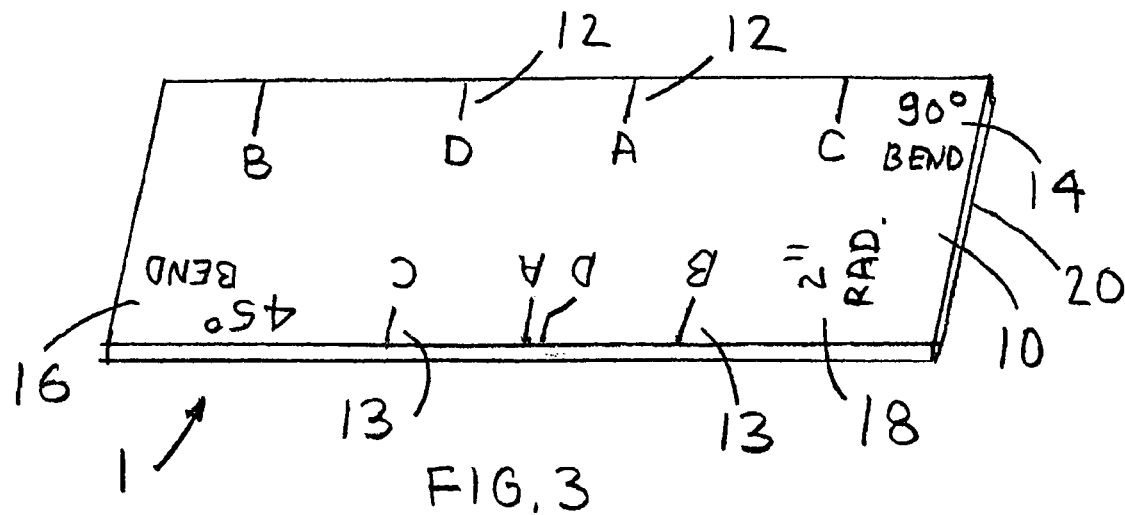
FIG. 3 is a perspective view of a bending template formed on a flat plate in accordance with the present invention.

With reference to FIG. 3, the pipe bending template 1 includes a plate 10 and at least one set of indicator marks 12. A letter (character) A, B, C or D is preferably displayed adjacent to an end of each of the indicator marks 12. A first bend angle 14 is displayed adjacent to the first set of indicator marks 12. A second bend angle 16 is displayed adjacent to a second set of indicator marks 13. A letter A, B, C or D is displayed adjacent to an end of each of the second indicator marks 12. A bend radius 18 is also displayed on the plate 10. Additional indicator marks, bend angles and bend radii may be displayed on a back side 20 of the plate 10.

Figure 4:
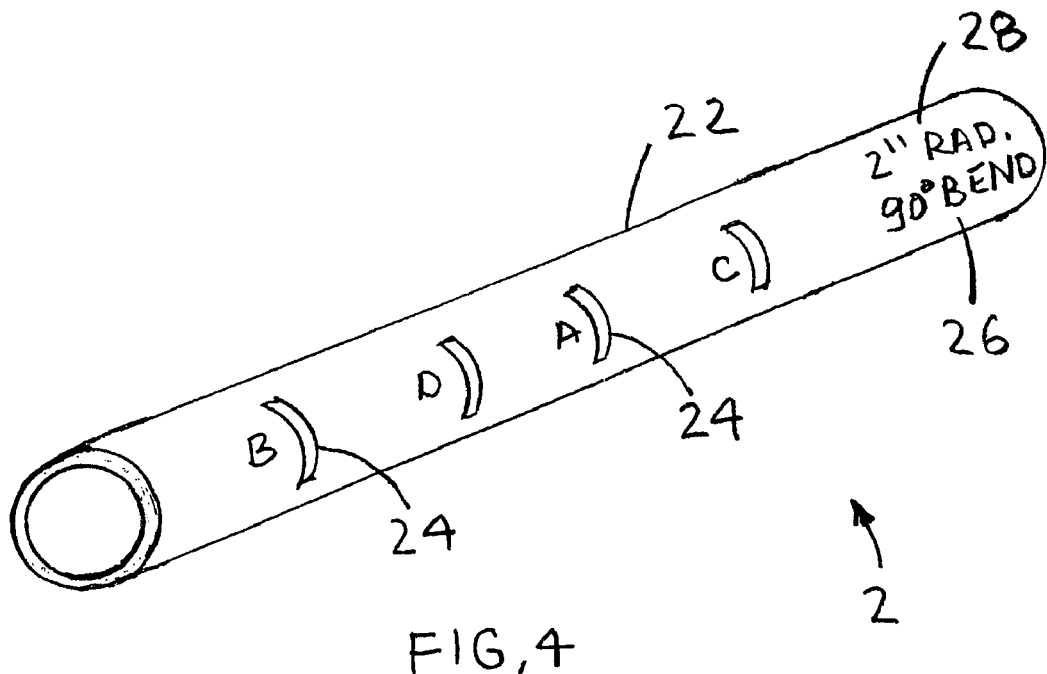
FIG. 4 is a perspective view of a second embodiment of a bending template formed from a tube in accordance with the present invention.

With reference to FIG. 4, the pipe bending template 2 includes a tube 22 and at least one set of indicator slots 24. An inner perimeter of the tube 22 is sized to receive an outer perimeter of a pipe to be bent. A letter A, B, C or D is displayed adjacent to each one of the indicator slots 24. A bend angle 26 and a bend radius 28 are displayed adjacent to the indicator slots 24.

Figure 5:
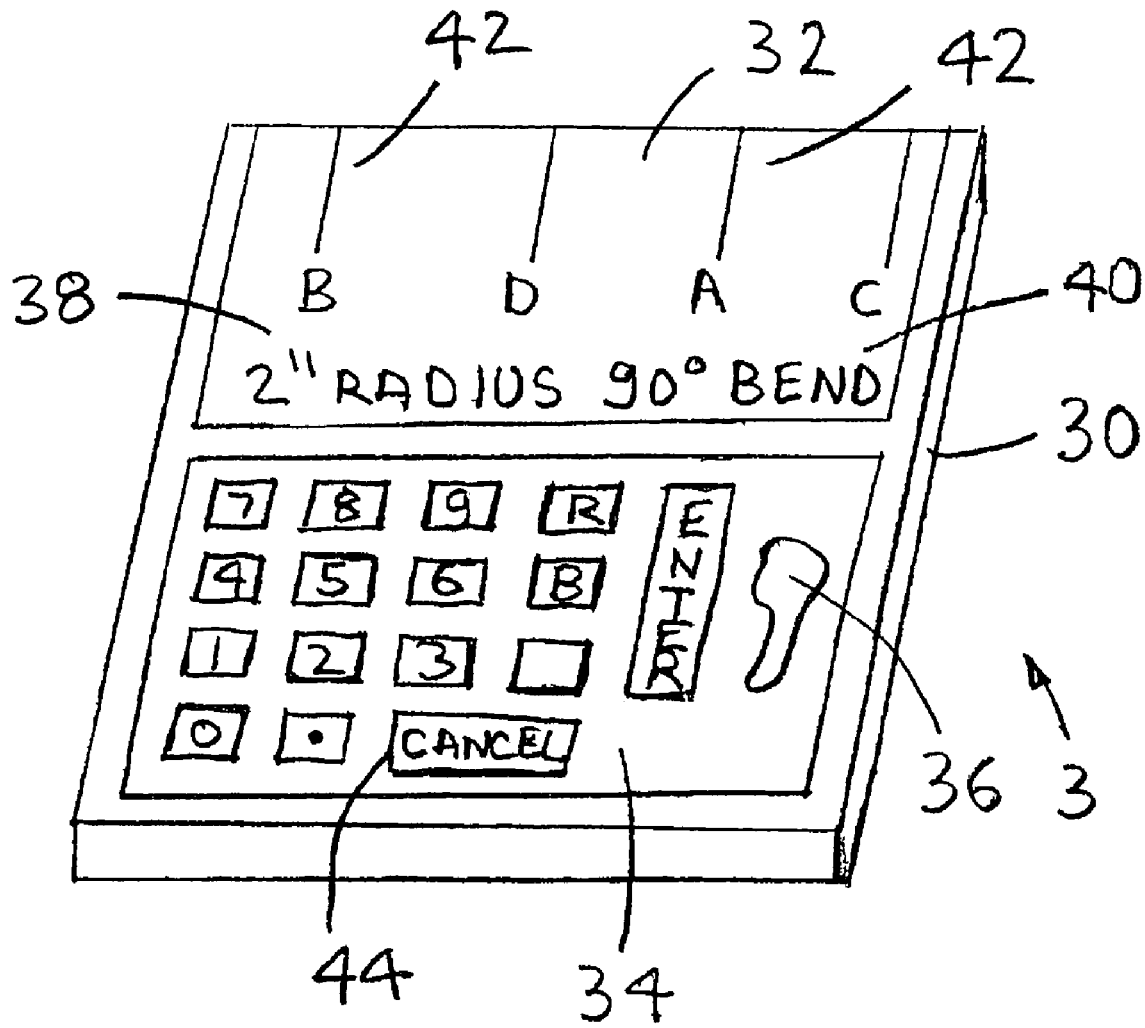
FIG. 5 is a perspective view of a third embodiment of a bending template created with a flat screen display in accordance with the present invention.

With reference to FIG. 5, the pipe bending template 3 includes a case 30, a flat screen display 32, a keyboard 34 and an electronic circuit 36. The flat screen display 32, a keyboard 34 and an electronic circuit 36 are retained by the case 30. A user enters a value of a bend radius 38 and a value of a bend angle 40 into the electronic circuit 36 through the keyboard 34. The electronic circuit 36 calculates the positions of a set of indicator marks 42 and displays thereof on the flat screen display 32. Electronic circuits for calculating numeric and trigonometric functions are well known in the art and need not be explained in detail. A letter A, B, C or D is displayed below each indicator mark 42. When the user is done marking a pipe, the display of the bend radius 38, the bend angle 40 and the indicator marks 42 are canceled by pressing the cancel key 44.

With reference to FIGS. 6-7, the pipe bending template 4 includes a slide rule 46. The slide rule 46 includes a reference base 48 and a set of moveable indicator strips 50. The reference base 48 preferably includes a lengthwise dovetail slot 52 displayed in a top thereof. A plurality of rows 55 are formed on the top of the reference base 48 to display sets of indicator marks 54 for different bend radii 56 at different bend angles 58. The indicator marks 54 may also be color coded for different bend radii 56.

Each moveable indicator strip 50 includes an indicator strip 58, a dovetail block 60, a tightening knob 62. An indicator line 64 is displayed along a length of the indicator strip 58. A letter A, B, C or D is displayed within the indicator line 64. The indicator strip 58 is fabricated from a clear or translucent material. Each dovetail block 60 is sized to be slidably received by the lengthwise dovetail slot 52. A threaded shaft 66 extends from each tightening knob 62. The indicator lines 64 of the indicator strips 58 are aligned with the appropriate indicator marks 54. Then each moveable indicator strip 50 is secured to the reference base 48 by rotating the tightening knob 62.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A pipe bending template comprising:
an object;
a first indicator mark is displayed on said object;
a second indicator mark is displayed a first distance left of said first indicator mark on said object, said first distance having a value substantially of a tangent of a half an angle value multiplied by a radius value of a pipe bend;
a third indicator mark is displayed a second distance right of said second indicator mark on said object, said second distance having a value substantially of multiplying said radius value, said angle value and 0.01745; and
a fourth indicator mark is displayed a third distance left of said third indicator mark on said object, said third distance being substantially equal to said first distance.

2. The pipe bending template of claim 1, further comprising:
a character is displayed adjacent each one of said indicator marks.

3. The pipe bending template of claim 1, further comprising:
said angle value and said radius value are displayed on said object.

4. The pipe bending template of claim 1, further comprising:
said object having at least one of a straight length and a flat surface.

5. The pipe bending template of claim 1, further comprising:
said object is a plate.

6. The pipe bending template of claim 1, further comprising:
said object is a tube with an inner perimeter that is sized to receive a pipe to be marked, said indicator marks being indicator slots.

7. The pipe bending template of claim 1, further comprising:
said object including a flat screen display, a keyboard and an electronic circuit, said radius value, said angle value and said indicator marks being displayed on said flat screen display by said electronic circuit and through entry on said keyboard.

8. The pipe bending template of claim 1, further comprising:
said object is a slide rule with a reference base and at least four indicator strips, said at least four indicator strips being slidably engaged with said reference base, said reference base including a plurality of indicator marks for aligning said at least four indicator strips.

9. A pipe bending template comprising:
an object;
a first indicator mark is displayed on said object;
a second indicator mark is displayed a first distance left of said first indicator mark on said object, said first distance having a value substantially of a tangent of a half an angle value multiplied by a radius value of a pipe bend;
a third indicator mark is displayed a second distance right of said second indicator mark on said object, said second distance having a value substantially of multiplying said radius value, said angle value and 0.01745;
a fourth indicator mark is displayed a third distance left of said third indicator mark on said object, said third distance having substantially equal to said first distance; and
a character is displayed adjacent each one of said indicator marks.

10. The pipe bending template of claim 9, further comprising:
said angle value and said radius value are displayed on said object.

11. The pipe bending template of claim 9, further comprising:
said object having at least one of a straight length and a flat surface.

12. The pipe bending template of claim 9, further comprising:
said object is a plate.

13. The pipe bending template of claim 9, further comprising:
said object is a tube with a inner perimeter that is sized to receive a pipe to be marked, said indicator marks being indicator slots.

14. The pipe bending template of claim 9, further comprising:
said object including a flat screen display, a keyboard and an electronic circuit, said radius value, said angle value and said indicator marks being displayed on said flat screen display by said electronic circuit and through entry on said keyboard.

15. The pipe bending template of claim 9, further comprising:
said object is a slide rule with a reference base and at least four indicator strips, said at least four indicator strips being slidably engaged with said reference base, said reference base including a plurality of indicator marks for aligning said at least four indicator strips.

16. A pipe bending template comprising:
an object;
a first indicator mark is displayed on said object;
a second indicator mark is displayed a first distance left of said first indicator mark on said object, said first distance having a value substantially of a tangent of a half an angle value multiplied by a radius value of a pipe bend;
a third indicator mark is displayed a second distance right of said second indicator mark on said object, said second distance having a value substantially of multiplying said radius value, said angle value and 0.01745;
a fourth indicator mark is displayed a third distance left of said third indicator mark on said object, said third distance having substantially equal to said first distance;
a character is displayed adjacent each one of said indicator marks; and
said angle value and said radius value are displayed on said object.

17. The pipe bending template of claim 16, further comprising:
said object is a plate.

18. The pipe bending template of claim 16, further comprising:
said object is a tube with a inner perimeter that is sized to receive a pipe to be marked, said indicator marks being indicator slots.

19. The pipe bending template of claim 16, further comprising:
said object including a flat screen display, a keyboard and an electronic circuit, said radius value, said angle value and said indicator marks being displayed on said flat screen display by said electronic circuit and through entry on said keyboard.

20. The pipe bending template of claim 16, further comprising:
said object is a slide rule with a reference base and at least four indicator strips, said at least four indicator strips being slidably engaged with said reference base, said reference base including a plurality of indicator marks for aligning said at least four indicator strips.

* * * * *